(12) United States Patent
Jones et al.

(10) Patent No.: US 8,298,986 B2
(45) Date of Patent: Oct. 30, 2012

(54) STRUCTURES FOR CAPTURING $CO_2$, METHODS OF MAKING THE STRUCTURES, AND METHODS OF CAPTURING $CO_2$

(75) Inventors: Christopher W. Jones, Mableton, GA (US); Jason C. Hicks, Atlanta, GA (US); Daniel J. Fauth, Pittsburgh, PA (US); McMahan Gray, Pittsburgh, PA (US)

(73) Assignee: Georgia Tech Research Corporation, Atlanta, GA (US)

( * ) Notice: Subject to any disclaimer, the term of this patent is extended or adjusted under 35 U.S.C. 154(b) by 446 days.

(21) Appl. No.: 11/637,477

(22) Filed: Dec. 12, 2006

(65) Prior Publication Data

US 2007/0149398 A1 Jun. 28, 2007

Related U.S. Application Data

(60) Provisional application No. 60/749,398, filed on Dec. 12, 2005.

(51) Int. Cl.
*B01J 20/22* (2006.01)

(52) U.S. Cl. .......... 502/401; 95/139; 423/220; 423/228; 423/230

(58) Field of Classification Search .................. 502/401; 95/139; 423/220, 230, 228
See application file for complete search history.

(56) References Cited

U.S. PATENT DOCUMENTS

| | | | |
|---|---|---|---|
| 3,885,927 A * | 5/1975 | Sherman et al. ............. | 95/139 |
| 5,507,848 A | 4/1996 | Beckman ........................ | 55/522 |
| 5,631,327 A | 5/1997 | Beckman .................... | 525/323.2 |
| 5,849,847 A | 12/1998 | Quirk ........................... | 525/193 |
| 7,179,860 B2 | 2/2007 | Cao et al. ...................... | 524/575 |
| 2005/0094485 A1 | 5/2005 | Demers et al. | |
| 2005/0101476 A1 | 5/2005 | Burch et al. | |
| 2006/0165574 A1 | 7/2006 | Sayari | |

FOREIGN PATENT DOCUMENTS

WO  WO/2006/094411  9/2006

OTHER PUBLICATIONS

Xu etl al., Preparation and characterization of novel CO2 "molecular basket" absorbents based on polymer-modified mesoporous molecular sieve MCM-41, 2003, Microporous and mesoporous Materials, 62, 29-45.*

Jones et al., Elucidating the role of silica surfaces in the rong-opening polymerization of lactide: catalytic behavior of silica-immobilized immobilized zinc B-diiminate complexes, 2004, Journal of catalysis, 222, 558-564.*

Kim at al., Tailoring Pore Properties of MCM-48 Silica for Selective Adsorption of CO2, 2005, J. Phys. Chem. B, 6287-6293.*

Xu, et al.; Novel Polyethylenimine-Modified Mesoporous Molecular Sieve of MCM-41 Type as High-Capacity Adsorbent for CO2 Capture; Energy & Fuels; 2002, 16, 1463-1469.

(Continued)

*Primary Examiner* — Colleen Dunn
*Assistant Examiner* — Pritesh Dajri
(74) *Attorney, Agent, or Firm* — Thomas, Kayden, Horstemeyer & Risley, LLP

(57) ABSTRACT

Briefly described, embodiments of this disclosure, among others, include carbon dioxide ($CO_2$) sorption structures, methods of making $CO_2$ sorption structures, and methods of using $CO_2$ sorption structures.

17 Claims, 7 Drawing Sheets

OTHER PUBLICATIONS

Leal, et al.; Reversible Adsorption of Carbon Dioxide on Amine Surface-Bonded Silica Gel; Inorganica Chemica Acta; 240; 1995; 183-189.

Tsuda, et al.; Polyethyleneimine and Macrocyclic Polyamine Silica Gels Acting as Carbon Dioxide Absorbents; J. Chem. Soc., Chem. Commun., 1992; 1659-1661.

Tsuda, et al.; Amino Silica Gels Acting as a Carbon Dioxide Absorbent; Chemistry Letters; 1992; 2161-2164.

Xh, et al.; Preparation and Characterization of Novel $CO_2$ "molecular basket" adsorbents based on Polymer-Modified Mesoporous Molecular Sieve MCM-41; Microporous and Mesoporous Materials 62 (2003) 29-45.

B.A. Morrow; The Raman Spectrum of Chemisorbed Methanol on Silica. A Comparison with the Infrared Technique; The Journal of Physical Chemistry, vol. 81, No. 26, 1977.

Drese, et al.; Synthesis-Structure-Property Relationships for Hyberbranched Aminosilica $CO_2$ Adsorbents; Adv. Funct. Mater. 2009, 19, 3821-3832.

Vaidya, et al.; $CO_2$-Alkanolamine Reaction Kinetics: A Review of Recent Studies; Chem. Eng. Technol. 2007, 30, No. 11, 1467-1474.

Von Harpe, et al.; Characterization of Commercially Available and Synthesized Polyethylenimines for Gene Delivery; Journal of Cotrolled Release; 69; (2000) 309-322.

Choi, et al.; Adsorbent Materials for Carbon Dioxide Capture from Large Anthropogenic Point Sources; ChemSusChem; 2009, 2, 796-854.

* cited by examiner

Scheme 1. Synthesis of Hyperbranched Ethylene-Amine-Grafted Silica Sorbents.

US 8,298,986 B2

STRUCTURES FOR CAPTURING $CO_2$, METHODS OF MAKING THE STRUCTURES, AND METHODS OF CAPTURING $CO_2$

CLAIM OF PRIORITY TO RELATED APPLICATION

This application claims priority to co-pending U.S. provisional application entitled "Hydrophobic Aminosilicas for $CO_2$ Capture" having Ser. No. 60/749,398, filed on Dec. 12, 2005, which is entirely incorporated herein by reference.

STATEMENT REGARDING FEDERALLY SPONSORED RESEARCH OR DEVELOPMENT

This invention was made with government support under Agreement No. DE-AP26-05NT50323 awarded by the United States Department of Energy. The Government has certain rights in this invention.

TECHNICAL FIELD

The present invention(s) is generally related to structures for capturing $CO_2$.

BACKGROUND

The world continues to rely heavily on energy supplied by fossil fuels such as petroleum, coal and natural gas, and the forecast for future energy supplies does not indicate that the use of these three sources will diminish substantially in the coming years. The increasing use of these energy sources releases huge amounts of carbon dioxide in the atmosphere every year, and there is increased pressure throughout the world to limit these releases as a consequence of the real or perceived impact of $CO_2$ on global climate change.

A primary method to limit the release of $CO_2$ is to trap it at its release point for possible storage via one of several potential sequestration technologies. A key roadblock is the development of cost-effective $CO_2$ capture/separation technologies, as these components of the process are expected to represent 75% of the total cost in oceanic or geologic sequestration methodologies. Excellent $CO_2$ separation technologies have been developed for acid gas removal from underground natural gas sources. This classic method uses aqueous amines to absorb $CO_2$, and a similar technology has been suggested for $CO_2$ capture from power plant effluents. However, the amine regeneration step, whereby the $CO_2$ is removed from the amine solution, is extremely energy intensive, making the cost of using this technology for $CO_2$ capture from flue gas streams too high. An alternate approach that is potentially much less costly is to apply solid adsorbents, for example in a fixed bed, for the adsorption of $CO_2$ from these streams. Indeed, many different solid adsorbents have been studied, including zeolites and strongly basic oxides such as hydrotalcites and MgO. However, the performance of these solids has not been satisfactory owing to problems arising from preferential water adsorption (on zeolites) or the high temperatures needed (for basic oxides).

An alternative technology that has only just begun to receive attention is the use of amine-functionalized silica or polymeric materials. These solids are inexpensive and operate well in the presence of water vapor, a requirement for separation of $CO_2$ from combustion streams. Most amine-functionalized silica materials have relatively limited capacities for $CO_2$ capture due to the small number of amines incorporated into the adsorbent material. The amine site density is normally limited by the surface area of the solid, which regulates the number of aminosilane molecules that can be used to graft the amine sites onto the solid support. Typical amine loading for these types of sorbents are 0.3-3 mmol/g solid. Thus, low amine loadings are a key factor limiting $CO_2$ capacity. Higher capacities can be achieved by physisorbing/impregnating poly(ethyleneimine) or other polymeric amines on silica or other supports. However, in this case, a lack of a covalent linkage to the support makes the long term stability of the material problematic.

Therefore, there is a need in the industry to overcome at least some of the aforementioned inadequacies and deficiencies.

SUMMARY

Briefly described, embodiments of this disclosure, among others, include carbon dioxide ($CO_2$) sorption structures, methods of making $CO_2$ sorption structures, and methods of using $CO_2$ sorption structures. One exemplary $CO_2$ sorption structure, among others, includes: a high surface area structure that includes a plurality of pores in the high surface area structure, wherein each pore has an inside surface, wherein at least the inside surface of the pore includes hydroxyl groups on the surface; a hyperbranched polymer covalently bonded to the inside surface of the pore via the oxygen of the hydroxyl group on the inside surface of the pore; wherein the $CO_2$ sorption structure is an inorganic/organic hybrid structure that is about 10 to 70% organic and about 30 to 90% inorganic.

Another $CO_2$ sorption structure, among others, includes: a high surface area structure that includes surface hydroxyl groups; a hyperbranched polymer covalently bonded to at least one surface oxygen; wherein the $CO_2$ sorption structure is an inorganic/organic hybrid structure that is about 0.1 to 70% organic and about 30 to 99.9% inorganic.

One exemplary method of removing $CO_2$ from a gas stream, among others, includes: providing a plurality of $CO_2$ sorption structures, wherein the $CO_2$ sorption structure comprises: a high surface area structure that includes surface hydroxyl groups; a hyperbranched polymer covalently bonded to at least one surface oxygen; wherein the $CO_2$ sorption structure is an inorganic/organic hybrid structure that is about 0.1 to 70% organic and about 30 to 99.9% inorganic; and exposing the plurality of $CO_2$ sorption structures to a gas stream that includes $CO_2$, wherein the hyperbranched polymer adsorbs $CO_2$.

Other structures, systems, methods, features, and advantages will be, or become, apparent to one with skill in the art upon examination of the following drawings and detailed description. It is intended that all such additional structures, systems, methods, features, and advantages be included within this description, be within the scope of the present disclosure, and be protected by the accompanying claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of this disclosure. Moreover, in the drawings, like reference numerals designate corresponding parts throughout the several views.

DETAILED DESCRIPTION

Figure 1:
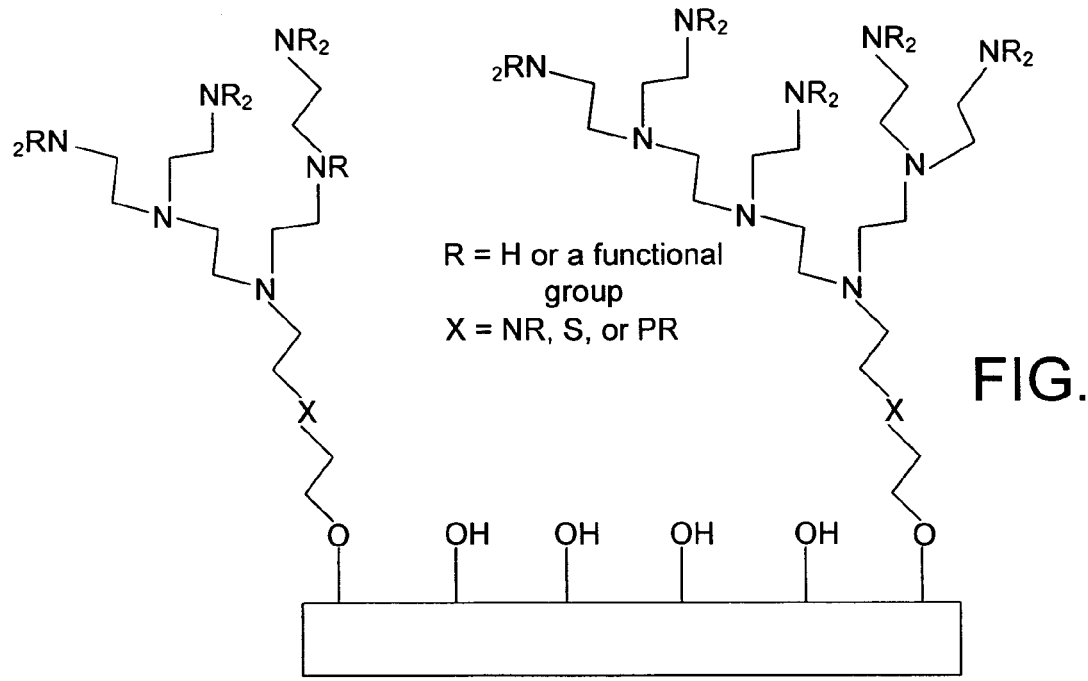
FIGS. 1 and 2 are schematics of illustrative embodiments of the present disclosure.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, inorganic chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

DEFINITIONS

The term "alkyl" refers to straight or branched chain hydrocarbon groups having 1 to 20 carbon atoms such as methyl, ethyl, n-propyl, i-propyl, n-butyl, i-butyl, t-butyl, pentyl, hexyl, heptyl, octyl, and the like.

The term "alkenyl" refers to straight or branched chain hydrocarbon groups having 2 to 20 carbon atoms and at least one double carbon to carbon bond (either cis or trans), such as ethenyl.

The term "alkynyl" refers to straight or branched chain hydrocarbon groups having 2 to 20 carbon atoms and at least one triple carbon to carbon bond, such as ethynyl.

The term "aryl" refers to aromatic homocyclic (i.e., hydrocarbon) mono-, bi- or tricyclic ring-containing groups preferably having 6 to 12 members, such as phenyl, naphthyl and biphenyl.

Discussion

Carbon dioxide ($CO_2$) sorption structures, methods of making $CO_2$ sorption structures, and methods of using $CO_2$ sorption structures, are disclosed. In general, the $CO_2$ sorption structure includes hyperbranched polymers (e.g., an ethylene-amine hyperbranched polymer) that adsorbs $CO_2$. The $CO_2$ sorption structure includes a high surface area structure that includes a plurality of pores in the structure. At least the inside surface of the pore (and maybe the outer surface) of the structure includes hydroxyl groups on the surface that are used as points to covalently bond to the hyperbranched polymers. Embodiments of the present disclosure can be used in fixed bed and/or fluidized bed adsorption processes as well as other processes in which $CO_2$ capture is desired. Embodiments of the present disclosure can be used to remove $CO_2$ from gases produced by the use (e.g., burning) of fossil fuels.

Embodiments of the present disclosure provide for $CO_2$ sorption structures that have one or more of the following: (i) a high density of amines to facilitate a large $CO_2$ capacity, (ii) adsorption sites (e.g., alkylamine groups) that are covalently linked to the high surface area solid support to provide stability, (iii) the ability to adsorb and desorb $CO_2$ repeatedly by a temperature swing or other dynamic process, and (iv) a low synthesis cost.

In particular, the high surface area of the structures (e.g., silica particles) and the hyperbranching of the polymer enable the $CO_2$ sorption structure to have a high $CO_2$ sorption capacity under conditions described herein. In addition, since the hyperbranched polymers are covalently bonded to the high surface area structure, the $CO_2$ sorption structure is stable in uses having temperature swings. Furthermore, embodiments of the $CO_2$ sorption structure can be produced in a simple, low cost, one step process.

In general, the hyperbranched polymers effectively utilize more of the space within the pores of the $CO_2$ sorption structure by filling much of the space with the hyperbranched polymers that are polymerized directly from the surface (rather than being synthesized elsewhere first and added to the support via impregnation). Most sorbents described in the prior art have a single monolayer of amine groups, usually introduced via 3-aminopropylalkoxysilane molecules, with a low total amine loading. It should be noted that the pores are not overfilled by the hyperbranched polymers, and there exists suitable space for the transport of gases through the pores via diffusion. Thus, embodiments of the present disclosure achieve a higher sorption capacity than previous systems, while having better long-term stability due to the covalently formed bonds between the structure and the hyperbranched polymer.

As mentioned above, the $CO_2$ sorption structure includes a high surface area structure and hyperbranched polymers covalently bonded to the high surface area structure. The high surface area structure can include, but is not limited to, porous structures (e.g., macroporous, mesoporous, microporous, nanoporous, or mixtures thereof) having surface hydroxyl groups. In particular, the high surface area structure can include, but is not limited to, silica, alumina, aluminosilicates, zirconia, germania, hafnia, and iron oxide.

In an embodiment, the high surface area structures are particles having a shape such as, but not limited to, a sphere, a polygon, a tube, a rod, a plate, amorphous shapes, and combinations thereof. In an embodiment, the high surface area structures are porous particles, in particular, porous silica particles.

The particle has a first dimension that is the largest dimension, where the first dimension is about 500 nm to 500 μm, about 500 nm to 5 μm, and about 1 μm to 5 μm.

As mentioned above, the high surface area structure includes a plurality of pores in the high surface area structure. At least the inside surface, and in some embodiments the inside and outside surface, of the pores includes hydroxyl groups on the surface that can covalently bond to the hyperbranched polymers. The pores have a diameter of about 1 nm to 50 nm, about 1 nm to 40 nm, about 1 nm to 30 nm, about 1 nm to 20 nm, about 1 to 10 nm, about 1 nm to 8 nm, and about 4 nm to 8 nm. The bare, high surface area structure has a total surface area of about 50 to 2000 $m^2/g$. The high surface area structure can have a total surface area after treatment of about 10 to 2000 $m^2/g$ and about 10 to 1500 $m^2/g$.

As described above, hyperbranched polymers are covalently attached to the high surface area structure. The monomer of the hyperbranched polymer is an aziridine monomer (e.g., $(CH_2)_2$—N(H or R3)) and/or a substituted aziridine monomer (e.g., $(CR1R2)_2$—N(H or R3)), where each of R1, R2, and R3 can be selected from: H, an alkyl, a substituted alkyl, an aryl, a substituted aryl, an alkenyl, a substituted alkenyl, an alkynyl, a substituted alkynyl, where the substitution can be from groups such as, but not limited to, F, Cl, Br, I, N, P, S, O, and the like, and combinations thereof. The monomer can form highly branched polymer chains by either a single or double branching at each N atom, and in some instances no branching. The monomer can react directly with the hydroxyl groups on the surface of the high surface area structure, creating a covalent bond with the polymer chain (FIG. 1) and/or can be indirectly bonded to the hydroxyl groups via a linker (FIG. 2), as described in more detail herein.

A "hyperbranched polymer" may be defined as a polymer in which the structural repeating unit has a connectivity of more than two. Hyperbranched polymers are polydisperse.

The hyperbranched polymer is synthesized from the high surface area structure (e.g., directly via the hydroxy group or indirectly via the linker). In an embodiment, the hyperbranched polymer is covalently bonded to the support via one or more of the oxygen atoms of the high surface area structure. In general, the $CO_2$ sorption structure can be formed by exposing a high surface area structure having surface hydroxyl groups to aziridine in an appropriate solvent (e.g., anhydrous toluene). A sufficient amount of a catalyst (e.g., glacial acetic acid) is added to catalyze the formation of the hyperbranched polymer. The mixture is stirred for about 8-24 hours at room temperature under an inert gas (e.g., argon). The resulting solid is filtered and rinsed with an appropriate solvent (e.g., toluene) and then dried. Additional details regarding preparation of the $CO_2$ sorption structure are described herein. In should be noted that a linking group can be reacted with the hydroxy groups prior to introduction of the aziridine. Typical linking groups will be organosilanes with a reactive atom on a carbon chain such as, but not limited to, N, S, P, or O. The linking group can be subsequently reacted with aziridine to form the hyperbranched polymer.

The $CO_2$ sorption structure is an inorganic/organic hybrid structure. The $CO_2$ sorption structure is about 0.1 to 70% organic, about 1 to 70% organic, about 5 to 70% organic, about 10 to 70% organic, about 15 to 70% organic, about 20 to 70% organic, about 25 to 70% organic, about 30 to 70% inorganic, about 35 to 70% organic, about 40 to 70% organic, about 45 to 70% organic, about 50 to 70% organic, and about 60 to 70% organic, while the $CO_2$ sorption structure is about 30 to 99.9% inorganic, about 30 to 99% inorganic, about 30 to 95% inorganic, about 30 to 90% inorganic, about 30 to 85% inorganic, about 30 to 80% inorganic, about 30 to 75% inorganic, about 30 to 70% inorganic, about 30 to 65% inorganic, about 30 to 60% inorganic, about 30 to 55% inorganic, about 30 to 50% inorganic, and about 30 to 40% inorganic. In an embodiment, the $CO_2$ sorption structure is about 30 to 40% organic and about 60 to 70% inorganic.

It should also be noted that the percent organic/inorganic could be expressed in mmol N/g of $CO_2$ sorption structure. For example, a $CO_2$ sorption structure that is 70% organic and 30% inorganic can be represented as having an organic loading of about 26.5 mmol N/g of $CO_2$ sorption structure and an inorganic loading of about 5 mmol $SiO_2$/g of $CO_2$ sorption structure. The mmol N/g of $CO_2$ sorption structure can be calculated for each of the ranges above.

The $CO_2$ sorption structure has a $CO_2$ sorption capacity of about 4 to 13 mol of $CO_2$/g, about 4 to 12 mol of $CO_2$/g, about 4 to 11 mol of $CO_2$/g, about 4 to 10 $CO_2$/g, about 4 to 9 mol of $CO_2$/g, about 4 to 8 mol of $CO_2$/g, about 4 to 7 mol $CO_2$/g, and about 4 to 6 mol of $CO_2$/g. The $CO_2$ sorption capacity is measured at about 25° C. in an impure gas mixture that includes $CO_2$, $H_2O$, $N_2$, $O_2$, and inert gases (e.g., Ar, He, Ne, Kr, and Xe). The impure gas mixture can also include CO and $SO_2$, which may be found in impure gases in which embodiments of the present disclosure may be used. It should be noted that the $CO_2$ sorption capacity is not measured in pure $CO_2$. Measurements in pure $CO_2$ can be conducted and this approach drastically inflates the sorption capacity. It is important to measure the capacity under conditions that mimic realistic flue gas streams, as is done here (described in more detail in the Example). The gas environment in which embodiments of the present disclosure are used in may not be limited to the gases described above. Thus, the gases listed above do not limit the environments that embodiments of the present disclosure can be used, but rather the gases mentioned above are used to test how embodiments of the present disclosure may function as they may be used in practice.

$CO_2$ can be removed from an environment by exposing the gas stream having the $CO_2$ to a plurality of $CO_2$ sorption structures. For example, the $CO_2$ sorption structures can be used in a fixed bed and/or fluidized bed adsorption systems and processes to remove $CO_2$ from a gas stream. The temperature of the gas stream and the temperature of the environment of the system using the $CO_2$ sorption structures should be less than about 200° C. The gas stream can include the gases mentioned above as well as other gases by the use of fossil fuels.

Figure 2:
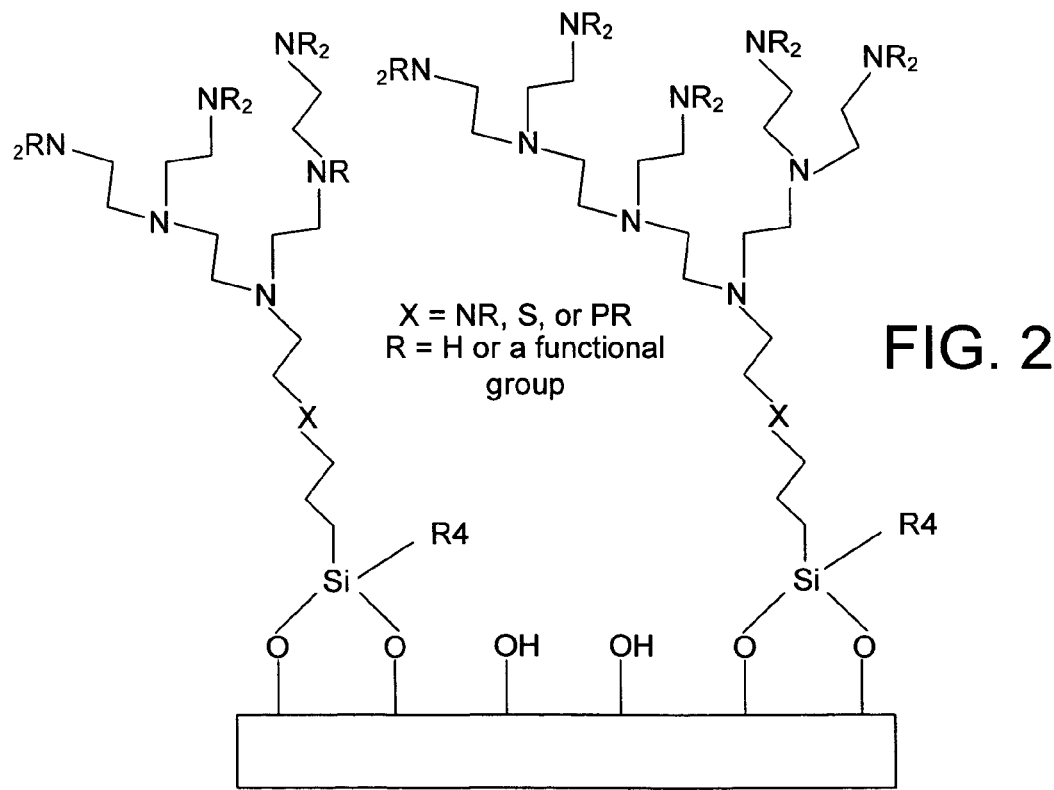

FIGS. 1 and 2 are schematics of illustrative embodiments of the present disclosure. FIG. 1 is a schematic that illustrates the hyperbranched polymer formed of aziridine monomers and/or substituted aziridine monomers (note, the carbon atoms of the monomers could include R rather than hydrogen as implicitly depicted). It should also be noted that R is a functional group such as, but not limited to, H, an alkyl, a substituted alkyl, an aryl, a substituted aryl, an alkenyl, a substituted alkenyl, an alkynyl, a substituted alkynyl, and combinations thereof, where the substitution can be from groups such as but not limited to, F, Cl, Br, I, N, P, S, O, and the like. The degree of branching of the hyperbranched polymer shown in FIG. 1 is not limiting, and more or less degrees of branching and/or larger or smaller polymers (molecular weight) can be formed. In an embodiment, each N can have 0, 1, or 2 branches, and the degree of branching depends in part upon the number of branches for each N. It should be noted that a number of N will be 1 or 2 due to the hyperbranching of the hyperbranching polymer and/or the synthesis employed. The hyperbranched polymer is covalently bonded to the high surface area structure via X—(CR1R2)$_2$ (R1 and R2 are not depicted in FIG. 1), where a carbon is bonded to the oxygen atom and X is bonded to the hyperbranched polymer. It should be noted that each of R1 and R2 can be H, an alkyl, a substituted alkyl, an aryl, a substituted aryl, an alkenyl, a substituted alkenyl, an alkynyl, a substituted alkynyl, and combinations thereof, where the substitution can be from groups such as but not limited to, F, Cl, Br, I, N, P, S, O, and the like, and where X is NR, S, or PR. It should be noted that for X—(CR1R2)$_q$, q is from 1 to 20. In an embodiment, X is N.

FIG. 2 is a schematic that illustrates the hyperbranched polymer formed of aziridine monomers and/or substituted aziridine monomers (note, the carbon atoms of the monomers could include R rather than hydrogen as implicitly depicted). It should also be noted that R is a functional group such as, but not limited to, H, an alkyl, a substituted alkyl, an aryl, a substituted aryl, an alkenyl, a substituted alkenyl, an alkynyl, a substituted alkynyl, and combinations thereof, where the substitution can be from groups such as but not limited to, F, Cl, Br, I, N, P, S, O, and the like. The degree of branching of the hyperbranched polymer shown in FIG. 2 is not limiting, and more or less degrees of branching and/or larger or smaller polymers (molecular weight) can be formed. The hyperbranched polymer is covalently bonded to the high surface area structure via X—(CR1R2)$_z$SiR4 (R1 and R2 are not depicted in FIG. 2), where Si is bonded to two oxygen atoms (as depicted), where z can be from 1 to 20, and where X is bonded to the hyperbranched polymer. R4 can be selected from, but is not limited to, an alkyl, a substituted alkyl, an alkenyl, a substituted alkenyl, a methyl, a substituted methyl, an alkoxyl, a substituted alkoxyl, a methoxy, a n-propoxy, an iso-propoxy, a halogen (e.g., chorine, bromine, iodine, and fluorine), $N(R)_2$, and the like.

It should be noted that Si can be bonded to 1, 2, or 3 surface oxygen atoms, and although FIG. 2 depicts Si bonded to 2 oxygen atoms, each Si can be bonded to 1, 2, or 3 surface oxygen atoms. If Si is bonded to only one oxygen, then Si can be bonded to groups such as, but not limited to, an alkyl, a substituted alkyl, an aryl, a substituted aryl, an alkenyl, a substituted alkenyl, a methyl, a substituted methyl, an alkoxyl, a substituted alkoxyl, a methoxy, a n-propoxy, an isopropoxy, a halogen (e.g., chorine, bromine, iodine, and fluorine), $N(R)_2$, and the like.

In general, the silicon compound used to form X—(CR1R2)$_z$SiR4 should have at least one group that will bond to the surface (e.g., an alkoxyl, an aryl, a substituted aryl, a substituted alkoxyl, a methoxy, a n-propoxy, and an isopropoxy) and one chain (CR1CR2)$_z$, but the other two groups on the silicon can be groups such as, but not limited to, surface reactive groups, additional (CR1CR2)$_z$ groups, and/or inert groups (e.g., an alkyl, an alkenyl, an aryl, and the like). Once the silicon compound bonds to the surface, it has at least one bond to an oxygen on the surface of the structure and at least one bond to a carbon chain (CR1R2)$_z$, while the other bonds, if any, are to one or more groups described above.

It should be noted that each of R1 and R2 can be H, an alkyl, a substituted alkyl, an aryl, a substituted aryl, an alkenyl, a substituted alkenyl, an alkynyl, a substituted alkynyl, and combinations thereof, where the substitution can be from groups such as but not limited to, F, Cl, Br, I, N, P, S, O, and the like, and where X is NR, S, or PR. It should be noted that if X is NR or PR, that R could be a branch of the hyperbranched polymer. In an embodiment, z is equal to 3. In an embodiment, R4 is —OMe.

Figure 3:
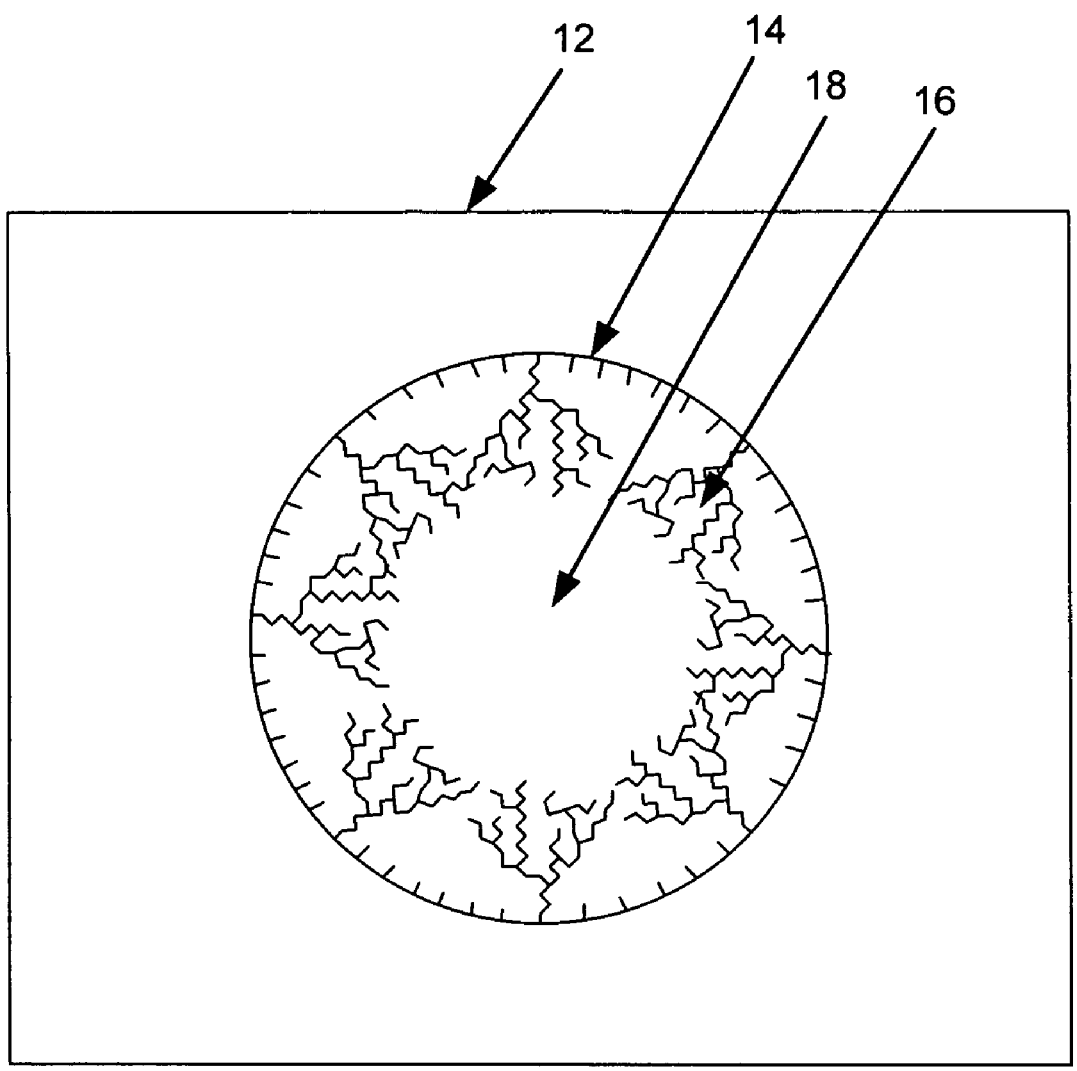
FIG. 3 is a schematic diagram depicting a cross-section of a high surface area structure having a pore that has hyperbranched polymer fabricated therein.

FIG. 3 is a schematic diagram depicting a cross-section of a high surface area structure having a pore that has hyperbranched polymers fabricated therein. The high surface area structure 12 includes a pore 14 having hyperbranched polymers 16 disposed on the inside surface of the pore 14. In addition, FIG. 3 shows that the hyperbranched polymer 16 includes many sites that can interact with $CO_2$ and that the high surface area structure 12 includes space 18 for the $CO_2$ to enter/exit the pore 14 during adsorption and desorption.

Figure 4:
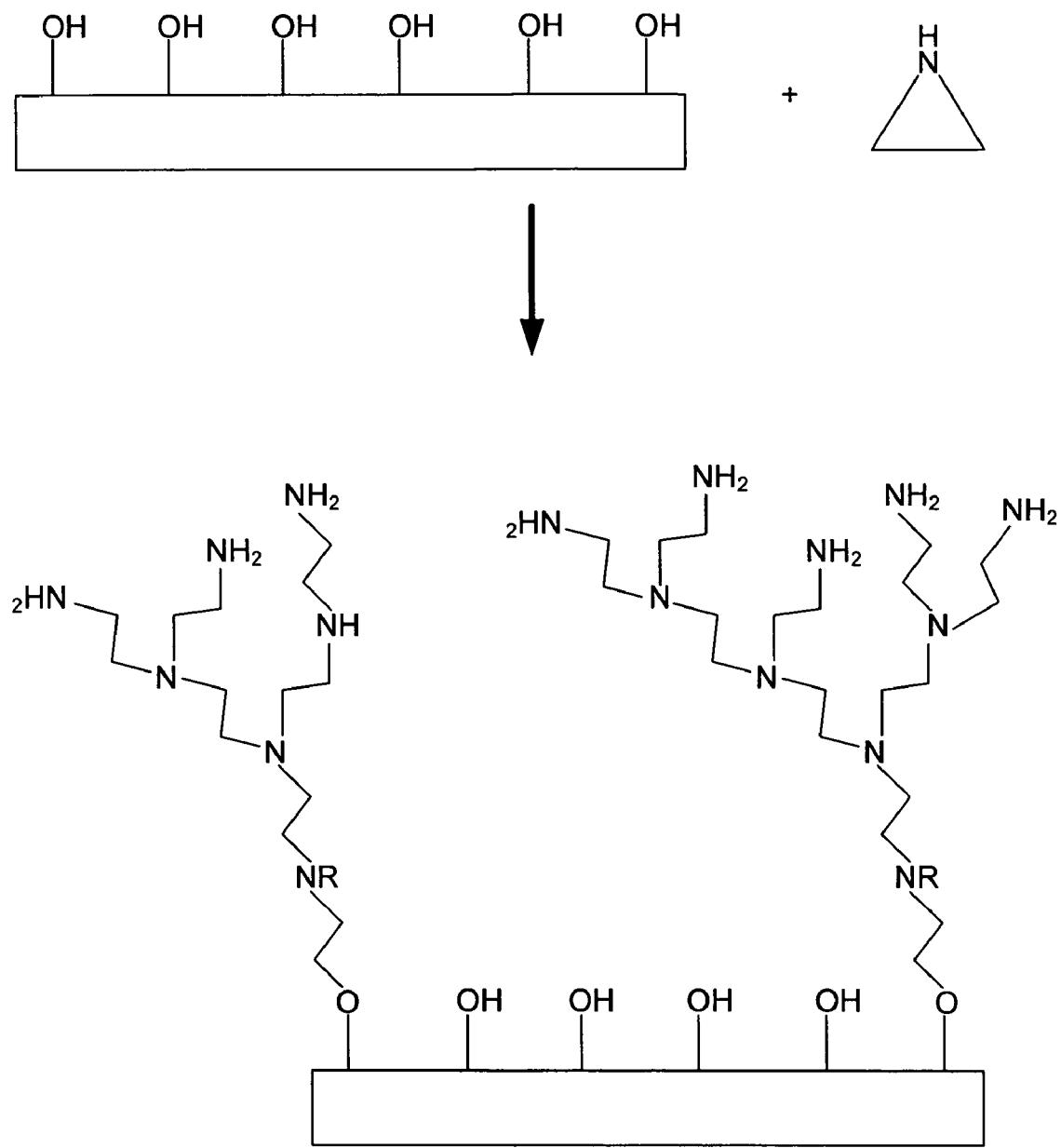
FIG. 4 illustrates a simplified reaction scheme for forming an embodiment of the $CO_2$ sorption structure.

FIG. 4 illustrates a simplified reaction scheme for forming an embodiment of the $CO_2$ sorption structure. In general, a high surface area structure having surface hydroxyl groups is exposed to aziridine under appropriate conditions, as described in more detail herein. The aziridine reacts with some of the surface hydroxyl groups from the hyperbranched polymer. The degree of branching and the size (molecular weight) of the hyperbranched polymer can be controlled by parameters such as, but not limited to, monomer loading, reaction time, solvent type and amount, temperature, and catalyst type and amount. It should be noted that R can be H or a branch of the hyperbranched polymer. In an embodiment, each N can have 0, 1, or 2 branches, and the degree of branching depends in part upon the number of branches for each N. It should be noted that a number of N will be 1 or 2 due to the hyperbranching of the hyperbranching polymer and/or the synthesis employed.

Figure 5:
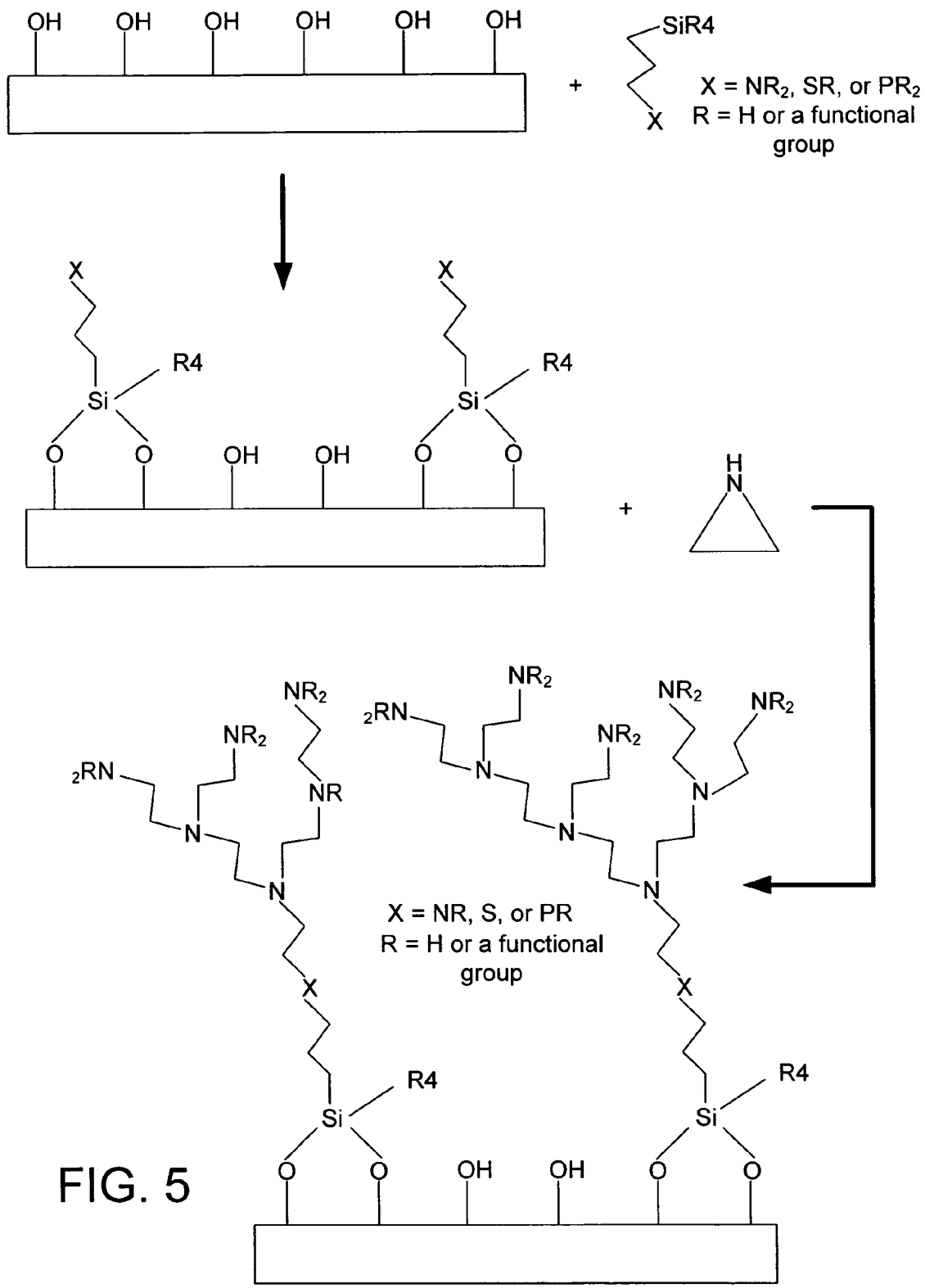
FIG. 5 illustrates a simplified reaction scheme for forming another embodiment of the $CO_2$ sorption structure.

FIG. 5 illustrates a simplified reaction scheme for forming an embodiment of the $CO_2$ sorption structure. In general, a high surface area structure having surface hydroxyl groups is exposed to a silicon compound having the formula $Si(OMe)_3(CR_2)_2(CH_2X)$, where X is $NR_2$, SR, or $PR_2$, and where R is a functional group such as, but not limited to, H, an alkyl, a substituted alkyl, an aryl, a substituted aryl, an alkenyl, a substituted alkenyl, an alkynyl, a substituted alkynyl, and combinations thereof, where the substitution can be from groups such as but not limited to, F, Cl, Br, I, N, P, S, O, and the like. A modified high surface area structure is formed when the silicon compound reacts with the hydroxyl groups to form a bond from Si to 1, 2, or 3 oxygen groups. It should be noted that X is NR, S, or PR. Next, the modified high surface area structure is exposed to aziridine under appropriate conditions, as described in more detail herein. The aziridine reacts with the X group from the hyperbranched polymer. It should be noted that R can be H or a branch of the hyperbranched polymer. In an embodiment, each N can have 0, 1, or 2 branches, and the degree of branching depends in part upon the number of branches for each N.

EXAMPLE

Now having described the embodiments of the sorbents in general, Example 1 describes some embodiments of the sorbents and uses thereof. The following is a non-limiting illustrative example of an embodiment of the present disclosure that is not intended to limit the scope of any embodiment of the present disclosure, but rather is intended to provide some experimental conditions and results. Therefore, one skilled in the art would understand that many experimental conditions can be modified, but it is intended that these modifications be within the scope of the embodiments of the present disclosure.

Experimental Methods
Materials

The following chemicals were commercially available and used as received: Pluronic 123 (Aldrich), HCl (Fisher), 3-aminopropyltrimethoxysilane (APTMS, Aldrich), tetraethylorthosilicate (TEOS, Aldrich), glacial acetic acid (Fisher), anhydrous toluene (Acros), sodium hydroxide pellets (VWR), and 2-chloroethylamine hydrochloride (Aldrich).

Synthesis of SBA-15 Support

Approximately 12.0 g of Pluronic 123 was weighed and added to a 1000 mL Erlenmeyer flask. To the polymer, 369 g of D.I. water and 67 g of HCl was added. This solution was stirred for about 3 hours (or until the polymer dissolved). Once the Pluronic 123 dissolved, 26.4 g of TEOS was added and stirred for 3 minutes. The solution was stirred in the oven for 20 hours at 35° C. A white precipitate was formed during this time period. At this point, the solution was not stirred and heated to 80° C. for 24 hours. The solution was quenched by adding approximately 400 mL of D.I. water. The precipitate was filtered and washed with D.I. water. The white solid was dried in the sample oven overnight. The calcination performed involved heating at 1.2° C./min to 200° C. and held for 1 hour. Finally, the last ramp was done at 1.2° C./min to 550° C. This temperature was held for 6 hours. The calcined SBA was subsequently dried at 200° C. under vacuum for 3 hours. (See: D. Zhao, Q. Huo, J. Feng, B. F. Chmelka, G. D. Stucky, *J. Am. Chem. Soc.* 1998, 120, 6024; J. C. Hicks, R. Dabestani, A. C. Buchanan III, C. W. Jones, *Chem. Mater.* 2006, 18, 5022, each of which are incorporated herein by reference)

Synthesis of Aziridine

The aziridine was synthesized similarly to reported procedures with minor changes (See, V. P. Wystrach, D. W. Kaiser, F. C. Schaefer, *J. Am. Chem. Soc.* 1955, 77, 5915). A solution of 135 g of DI $H_2O$ and 23.14 g of NaOH was made. To this solution, 23.60 g of 2-chloroethylamine hydrochloride was added and heated to 50° C. for 2 hours. The product was then distilled at 530 mmHg. The amount of product collected was 6.99 g (80% yield). The aziridine was immediately cooled to 0° C. $^{13}$C NMR (400 MHz, $CDCl_3$): δ 18.1.

Reaction of Aziridine with SBA-15

The hyperbranched aminosilica (HAS) was synthesized by adding 2.04 g of aziridine to 1.10 g SBA-15 in anhydrous toluene. A small amount of glacial acetic acid (200 mg) was added to catalyze the reaction with the SBA-15 surface. The mixture was stirred overnight at room temperature under argon. The resulting solid was filtered and washed with copious amounts of toluene then dried at 50° C. under high vacuum.

Characterization Methods

Cross-polarization magic angle spinning (CP-MAS) NMR spectra were collected on a Bruker DSX 300-MHz instrument. Approximately 300 mg of the sample was packed in a 7-mm zirconia rotor and spun at 5 kHz. Typical $^{13}$C CP-MAS parameters were 3000 scans, a 90° pulse length of 4 μs, and recycle times of 4 s. Typical $^{29}$Si CP-MAS parameters were 5000 scans, a 90° pulse length of 5 μs, and recycle times of 5 s. FT-Raman spectra were obtained on a Bruker FRA-106 with a resolution of 2-4 $cm^{-1}$. At least 512 scans were collected. Thermogravimetric analysis (TGA) was performed on a Netzsch STA409. Samples were heated under air and nitrogen from 30 to 900° C. at a rate of 10° C./min. The organic loading was determined from the weight loss between 200 to 700° C. Nitrogen physisorption measurements were conducted on a Micromeritics ASAP 2010 at 77 K. The SBA-15 sample was pretreated by heating under vacuum at 200° C. for 24 h. The HAS sample was pretreated by heating at 100° C. under vacuum for 24 hours.

Adsorption Capacity Measurements in a Cahn Balance $CO_2$ uptake experiments were conducted using a microbalance assembly consisting of a Cahn TG-131 Thermogravimetric Analyzer (TGA). Gas compositions were created in blending high purity gases using mass flow controllers (Brooks model 5850E controller and Brooks model 5878 instrument readout). Carbon dioxide ($CO_2$) of stock grade (99.9%) was supplied via gas cylinder and pressure regulator, while a house supply of nitrogen was utilized. The gas stream was humidified using a sparger vessel filled entirely with deionized water. Gas relative humidity was verified using a Vaisala HMP-36 humidity/temperature probe and a Vaisala HMI-32 instrument readout. A moisture-laden gas stream was heat-traced with electric heating tapes controlled by variable autotransformers (Variac). Each heated section along the path had one heating tape with one thermocouple mounted on the external surface. Electric power to each tape was manually governed by a Variac setting to achieve temperature readout in excess of the dew point to prevent condensation. A circulating bath of ethylene glycol/water was used to provide fine temperature control of the gas mixture prior to the gas entering the reactor assembly. For a typical experiment, 15 mg of sample was charged into a quartz cylindrical sample pan and heated under $N_2$ from ambient temperature to 105° C. (This was done to drive-off any pre-adsorbed water and/or $CO_2$.) Sample temperature within the reactor assembly was measured and controlled with a type K thermocouple placed just below the suspended sample pan. After reaching constant weight, the temperature was cooled to respective adsorption temperature, in our case 40° C. The sample was then introduced to a humidified $N_2$ stream (until again constant weight of the sample was achieved) followed by a stream consisting of both $CO_2$ and $H_2O$. The gain in sample weight corresponds to the sorption of both $CO_2$ and $H_2O$. The final stages within the experiment were conducted under a dry $CO_2$ stream and dry $N_2$ stream respectively. The loss in sample weight during exposure to the dry $CO_2$ stream relates to the weight loss due to water uptake of the sample. Lastly, $CO_2$ was desorbed from the surface of the sorbent under dry nitrogen. Total gas flow rate was held constant throughout experiment at 200 cc/min.

Adsorption Capacity Measurements in a Fixed Bed Flow System.

$CO_2$ capture capacities were determined by the combination of Temperature Programmed Desorption (TPD) and Mass Spectrometry (MS) analyses. An Ominostar mass spectrometer from Pfeiffer Vacuum was selected for the analyses of all the simulated flue gas application. In a typical test run, an approximately one gram sample of the sorbent was charged to the tubular reactor and the sample was pretreated with a 2% Water/Helium gas stream at the flow of 200 ml/min. The temperature was maintained at 25° C. under atmospheric pressure during this pretreatment period. After 30 minutes, the reactor was by-passed and the reaction gas of 10% Carbon Dioxide/2% Water/Helium was directed to the mass spectrometer to form the baseline carbon dioxide concentration required for these tests. The gas flow was maintained at 160 ml/min over the capture temperature range of 25-65° C. at atmospheric pressure for the adsorption of carbon dioxide. Then the reaction gas stream was switched to the reactor and the amount of carbon dioxide captured by the sorbent was tracked by the mass spectrometer. After approximately 35 minutes the gas stream was switched back to the pretreatment conditions and the reactor temperature was increased to 90° C. to start the desorption stage for the sorbent. After approximately 1.0 hour the reactor was then the cooled back to 25° C. completing the adsorption/desorption test. The breakthrough curve was generated by a spreadsheet and the area of the adsorption curve was calculated by a linear integration method.

Results and Discussion

Figure 6A:
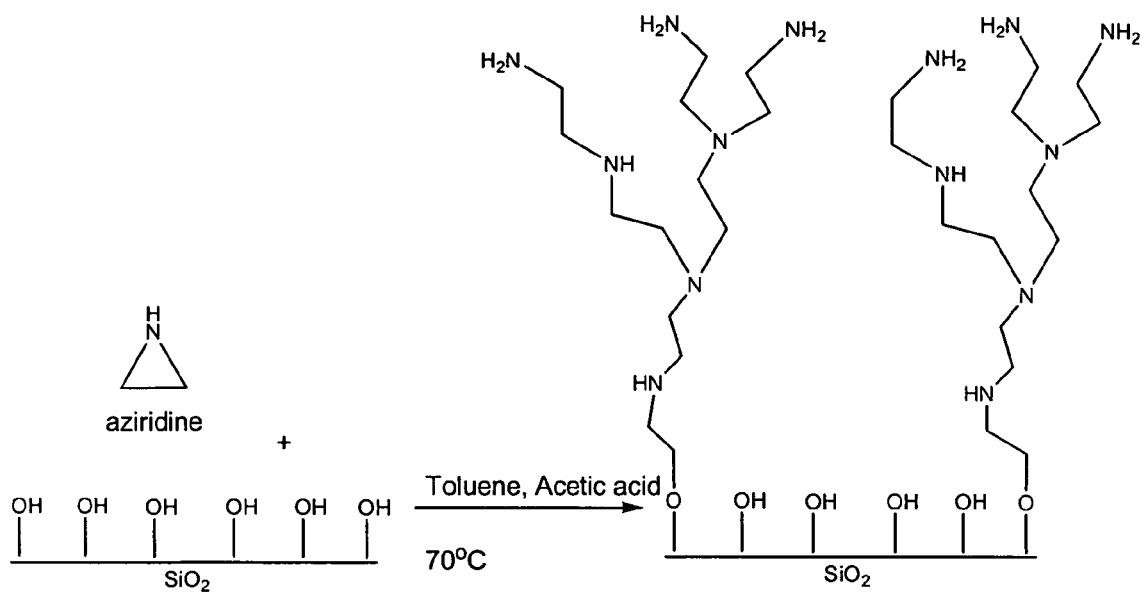
FIG. 6A illustrates an embodiment of a synthesis of the hyperbranched aminosilica sorbent occurs via a one-step reaction between aziridine and the silica surface (Scheme 1).
Figure 6B:
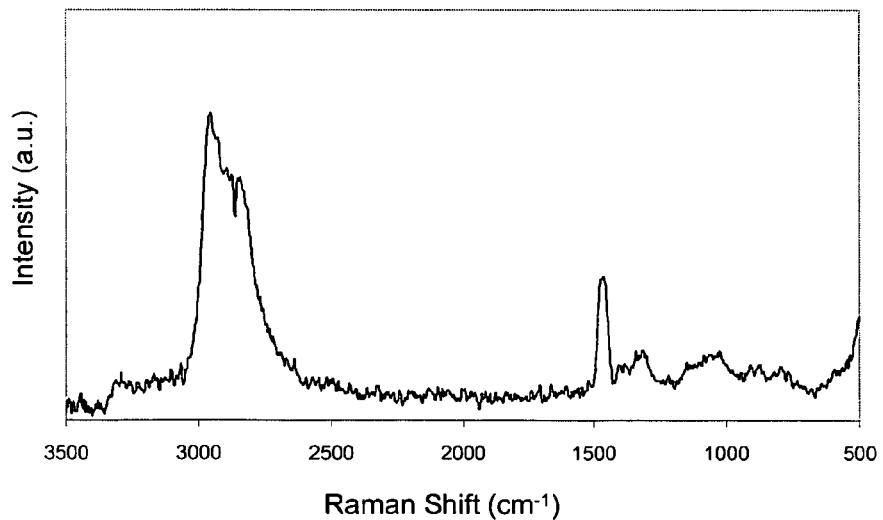
FIG. 6B illustrates an FT-Raman Spectrum of hyperbranched aminosilica sorbent.

The synthesis of the hyperbranched aminosilica sorbent occurs via a one-step reaction between aziridine and the silica surface (Scheme 1, FIG. 6B). The advantage of this method involves the stability of the organic material, as it is covalently bonded to the silica surface and less likely to leach when subjected to organic solvents or relatively high temperatures. The characterization of the grafted hyperbranched aminosilica with thermogravimetric analysis (TGA) indicates a loading of 13 mmol N/g material. When studied by nitrogen physiorption, the organic material functionalizes both the exterior and interior of the mesoporous support (Table 1). This is seen by the decrease in BET surface area (from 932 to 183 m²/g) and the BJH pore diameter (from 65 to 46 Å) from the calcined SBA-15 material to the hyperbranched aminosilica material (Table 1).

TABLE 1

Nitrogen Physisorption and TGA Results.
Nitrogen Physisorption Results at 77 K and TGA Data

| Sample | Average pore diameter (Å) | BET surface area (m²/g SiO₂) | Aziridine Loading (mmol/g material) |
| --- | --- | --- | --- |
| SBA-15 | 65 | 932 | — |
| SBA-Hyperbranched Aminosilica | 46 | 183 | 13 |

The FT-Raman of the hyperbranched aminosilica sorbent spectrum shows two distinct peaks associated with the formation of a hyperbranched aminosilica (FIG. 6B). The C—H aliphatic transition is seen between 3000-2750 $cm^{-1}$, while the $CH_2$ tranition is seen at 1457 $cm^{-1}$. Both of these transitions indicate that the ring-opening reaction of aziridine takes place in the presence of the silica support.

Figure 7:
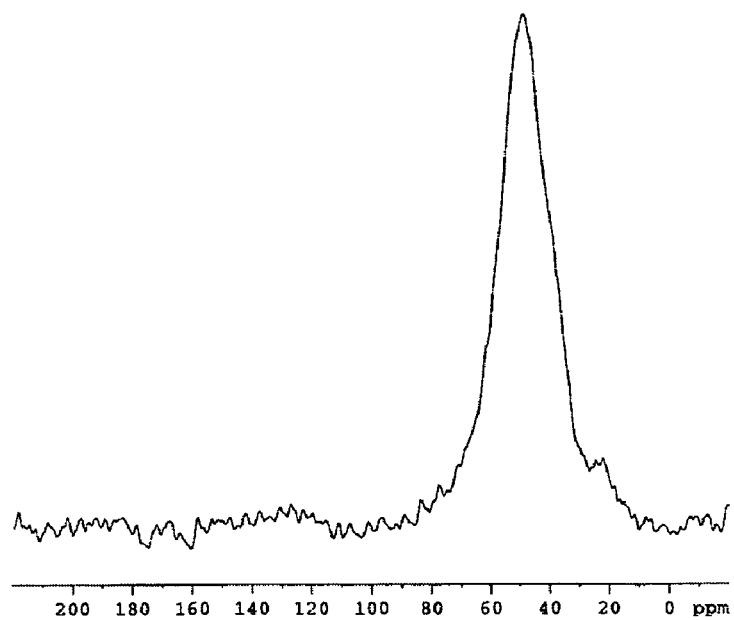
FIG. 7 illustrates a solid state $^{13}C$ CP-MAS NMR of hyperbranched aminosilica sorbents.

Solid state $^{13}C$ CP-MAS spectroscopy shows the presence of a broad peak between 20 and 70 ppm (FIG. 7). The broad peak includes carbon resonances from the different types of carbons present in the hyperbranched aminosilica material (Scheme 1). For instance, a broad peak is expected since multiple types of $CH_2$ groups are present in the material, which forms overlap between the various $^{13}C$ resonances (Si—O—$CH_2$—, Si—O—$CH_2$—$CH_2$—$NH_2$, Si—O—$CH_2$—$CH_2$—NH—$CH_2$—, Si—O—$CH_2$—$CH_2$—N—($CH_2$—)$CH_2$—, etc.).

Figure 8:
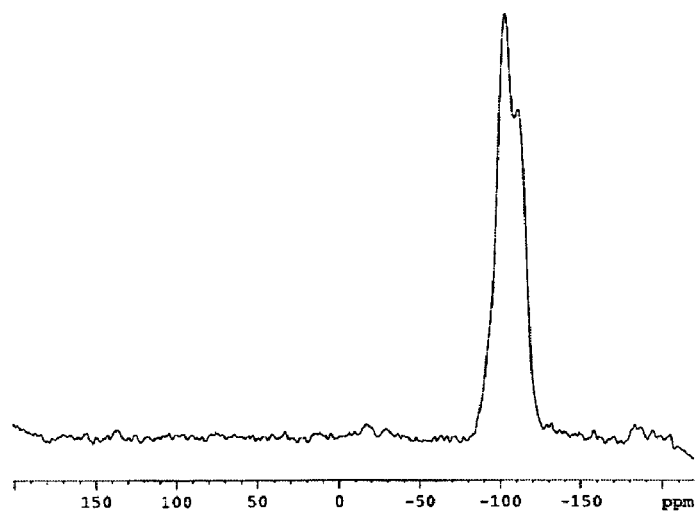
FIG. 8 illustrates a solid state $^{29}Si$ CP-MAS NMR of hyperbranched aminosilica sorbents.

Solid state $^{29}Si$ CP-MAS spectroscopy shows the presence of three overlapping peaks between −90 and −110 ppm (FIG. 8). The $^{29}Si$ CP-MAS spectrum gives limited data, but shows the presence of the Q2, Q3, and Q4 peaks from the silica surface. It is important to see the Q2 and Q3 groups, since the aziridine ring-opens on these surface silanol groups.

Figure 9:
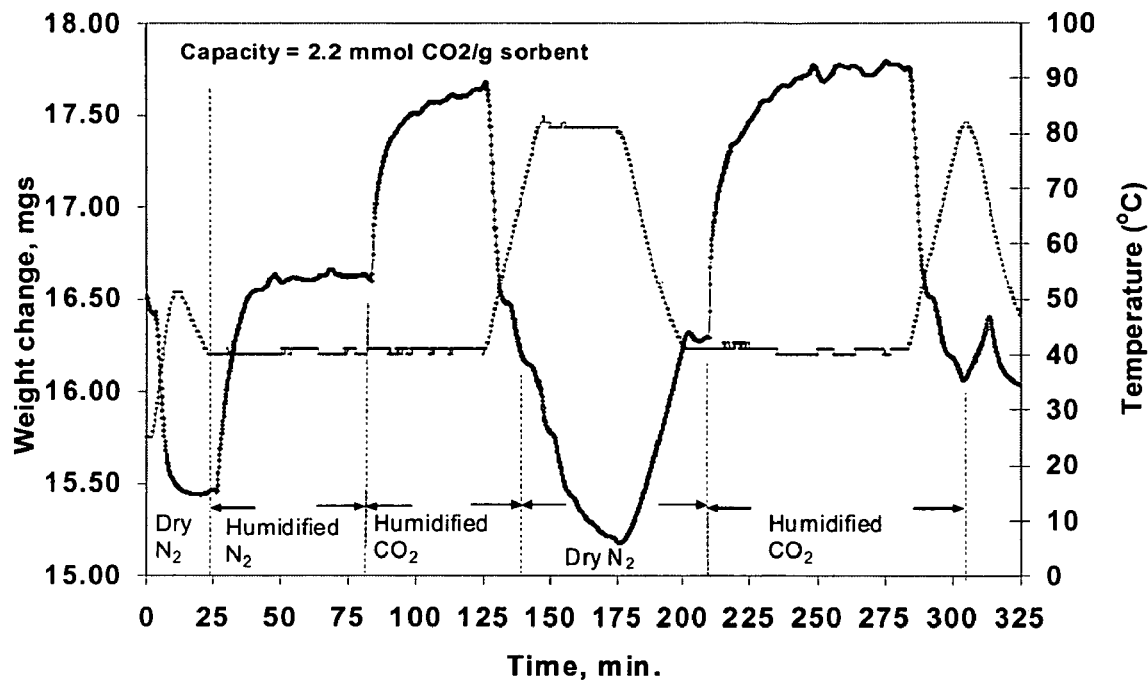
FIG. 9 illustrates a graph showing the results of Cahn balance experiments monitoring adsorption of humidified $CO_2$ on hyperbranched aminosilica sorbents.

Two experimental protocols to determine the sorption capacity of $CO_2$ were performed: (1) use of a TGA equipped with a Cahn balance and (2) use of a packed-bed flow system connected to a mass spectrometer. Due to the nature of the experiment, TGA/Cahn balance experiments routinely yield lower capacities than fixed bed, flow processes. This is commonly observed in the literature and is observed in this work as well. TGA results show $CO_2$ capacities of 2.2 mmol $CO_2$/g sorbent (FIG. 9). In these experiments, humidified $CO_2$ was flowed over a sample of the hyperbranched aminosilica. The weight gain was determined for both the water and the $CO_2$, to determine the adsorption capacity of the sorbent. Subsequently, the $CO_2$ was desorbed from the surface, and an additional capacity was determined.

The initial uptake of water follows an apparently simple exponential profile, and at any point along this profile the molar uptake of water can be calculated simply from the weight change. The total sorption measured gravimetrically exhibits an exponential behavior characteristic of a two-component process. In the presence of two species any point on the exponential profile can no longer be related to a specific molar uptake. However, with the sample weight defined as w(t) relative to dry weight, $w_o$ can be used to set the limits for either species since the following mass balance must apply:

$$1000[w(t)-w_o]/w_o = M_{H2O}S^{H2O} + M_{CO2}S^{CO2}$$

where M is the species molar mass (g) and S is the species uptake in mol/kg. Therefore, the need to find one of the species $S^{H2O}$ or $S^{CO2}$ by independent means (utilizing mass spectroscopy) is required to solve the equation. However, a close approximation of the $CO_2$ capacity (in mmol $CO_2$/g of sorbent) can be obtained by simple subtraction of the mass value obtained under a dry $CO_2$ stream from the initial dry weight of the sample, followed by division of the molar value of $CO_2$ (44 g/mole) times the initial dry weight of the sample.

Figure 10:
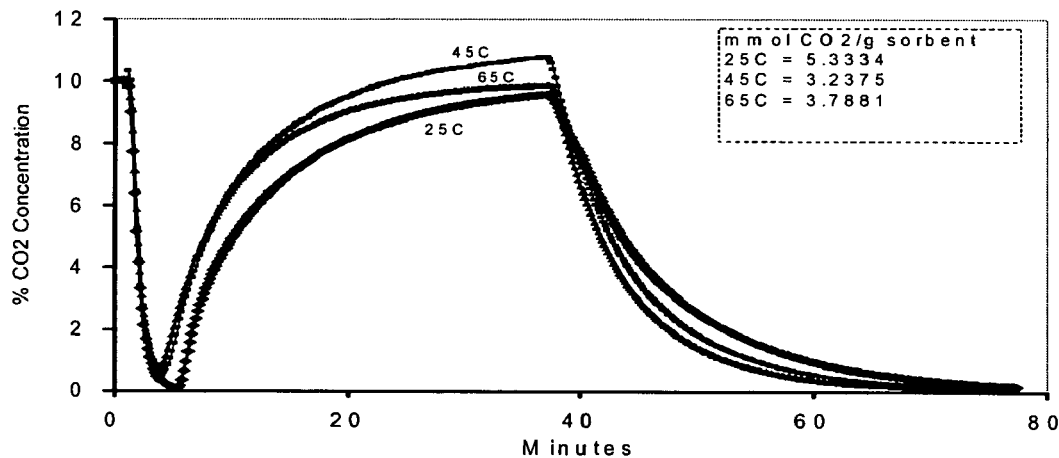
FIG. 10 illustrates a graph showing packed-bed flow experiments monitoring adsorption of humidified $CO_2$ on hyperbranched aminosilica sorbents as a function of temperature.

Similar studies were performed in a packed-bed flow reactor system. In these experiments, humidified $CO_2$ was flowed through a packed-bed of hyperbranched aminosilica sorbent. The adsorption of $CO_2$ was monitored by a mass spectrometer by developing a $CO_2$ breakthrough curve at various temperatures (FIG. 10). FIG. 10 shows the adsorption capacities of the hyperbranched aminosilica at 25° C., 45° C. and 65° C. The breakthrough curve shown at 25° C. was collected for the hyperbranched aminosilica after one regeneration, which shows a higher $CO_2$ capacity than the other two temperatures studied. The 45° C. and the 65° C. experiments were performed after additional regenerations of the aminosilica (representing the $4^{th}$ and $5^{th}$ regenerations building of the data in Table 2). The results indicate that a high $CO_2$ capacity can be obtained under a variety of temperatures with either fresh or regenerated adsorbent.

The reuse of the hyperbranched aminosilica was tested in the flow system by desorbing the $CO_2$ and subsequently adsorbing $CO_2$ (Table 2). The adsorption experiments were performed at 25° C. The results indicate that the fresh sorbent has the greatest capacity (6.051 mmol $CO_2$/g sorbent). After one regeneration, the sorbent's capacity of $CO_2$ remains constant at approximately 4.4 mmol $CO_2$/g sorbent. Thus, the sorbent is usable for at least 4 cycles, maintaining a high capacity.

TABLE 2

Packed-bed Flow Experiments Monitoring Adsorption of Humidified $CO_2$ on Hyperbranched Ethylene-Amine-Grafted Silica Sorbents as a Function of Regeneration Cycle. Flow Reactor Results

| Material | Regeneration | Amine Loading (mmol/g) | Capacity (mmol CO2/g) |
|---|---|---|---|
| Hyperbranched | Fresh | 13 | 6.051 |
| | 1st | 13 | 5.333 |
| | 2nd | 13 | 4.463 |
| | 3rd | 13 | 4.411 |
| | Avg | 13 | 5.065 |

SUMMARY

The use of a hyperbranched aminosilica capable of adsorbing approximately 5 mmol $CO_2$/g sorbent using a one step reaction between aziridine and the silica surface has been presented. The adsorption measurements were performed using both a Cahn balance and a packed-bed flow reactor. The advantage of this sorbent over previous sorbents is its large $CO_2$ capacity. The large capacity is associated with the synthetic method, which lead to the surface catalyzed growth of a hyperbranched amine-containing polymer.

It should be noted that ratios, concentrations, amounts, dimensions, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a range of "about 0.1% to about 5%" should be interpreted to include not only the explicitly recited range of about 0.1% to about 5%, but also include individual ranges (e.g., 1%, 2%, 3%, and 4%) and the sub-ranges (e.g., 0.5%, 1.1%, 2.2%, 3.3%, and 4.4%) within the indicated range.

It should be emphasized that the above-described embodiments of this disclosure are merely possible examples of implementations, and are set forth for a clear understanding of the principles of this disclosure. Many variations and modifications may be made to the above-described embodiments of this disclosure without departing substantially from the spirit and principles of this disclosure. All such modifications and variations are intended to be included herein within the scope of this disclosure and protected by the following claims.

Therefore, the following is claimed:

1. A $CO_2$ sorption structure, comprising:
   a high surface area structure that includes a plurality of pores in the high surface area structure, wherein each pore has an inside surface, wherein at least the inside surface of the pore includes hydroxyl groups on the surface; and
   a hyperbranched polymer covalently bonded to the inside surface of the pore directly to the oxygen of the hydroxyl group on the inside surface of the pore;
   wherein the $CO_2$ sorption structure is an inorganic/organic hybrid structure that is about 10 to 70% organic and about 30 to 90% inorganic.

2. The $CO_2$ sorption structure of claim 1, wherein the hyperbranched polymer is an ethylene-amine hyperbranched polymer.

3. The $CO_2$ sorption structure of claim 1, wherein the hyperbranched polymer includes a compound having the formula $R_wN—CR_2—CR_2$, wherein R is selected from the group consisting of: H and a functional group, wherein w is 0, 1, or 2.

4. The $CO_2$ sorption structure of claim 1, wherein the hyperbranched polymer includes a compound having the formula $H_wN—CH_2—CH_2$, wherein w is 0, 1, or 2.

5. The $CO_2$ sorption structure of claim 1, wherein the diameter of the pore is about 1 nm to 50 nm.

6. The $CO_2$ sorption structure of claim 1, wherein the high surface area structure has a total surface area of about 10 to 2000 $m^2$/g.

7. The $CO_2$ sorption structure of claim 1, wherein the $CO_2$ sorption structure has a $CO_2$ sorption capacity of about 4 to 13 mol of $CO_2$/g of $CO_2$, measured at about 25° C. in an impure gas mixture that comprises one or more gases selected from the group consisting of: $CO_2$, $H_2O$, $N_2$, $O_2$, and a combination thereof, wherein the $CO_2$ sorption capacity is not measured in pure $CO_2$.

8. The $CO_2$ sorption structure of claim 7, wherein the impure gas includes one or more gases selected from the group consisting of: Ar, He, Ne, Kr, and Xe.

9. The $CO_2$ sorption structure of claim 1, wherein the hyperbranched polymer is covalently bonded directly to the oxygen on the surface of the pore.

10. The $CO_2$ sorption structure of claim 1, wherein the high surface area structure is a silica.

11. A $CO_2$ sorption structure, comprising:
    a high surface area structure that includes surface hydroxyl groups;
    a hyperbranched polymer covalently bonded directly to at least one surface oxygen of the hydroxyl group;
    wherein the $CO_2$ sorption structure is an inorganic/organic hybrid structure that is about 0.1 to 70% organic and about 30 to 99.9% inorganic.

12. The $CO_2$ sorption structure of claim 11, wherein the hyperbranched polymer is a hyperbranched polymer formed from aziridines.

13. The $CO_2$ sorption structure of claim 12, wherein the hyperbranched polymer includes a compound having the formula $R_wN$—$CR_2$—$CR_2$, wherein R is selected from the group consisting of: H and an electron donating group, wherein w is 0, 1, or 2.

14. The $CO_2$ sorption structure of claim 12, wherein the hyperbranched polymer includes a compound having the formula $H_wN$—$CH_2$—$CH_2$, wherein w is 0, 1, or 2.

15. The $CO_2$ sorption structure of claim 11, wherein the $CO_2$ sorption structure is an inorganic/organic hybrid structure that is about 15 to 70% organic and about 30 to 85% inorganic.

16. The $CO_2$ sorption structure of claim 11, wherein the $CO_2$ sorption structure is an inorganic/organic hybrid structure that is about 20 to 70% organic and about 30 to 80% inorganic.

17. The $CO_2$ sorption structure of claim 11, wherein the $CO_2$ sorption structure is an inorganic/organic hybrid structure that is about 30 to 40% organic and about 60 to 70% inorganic.

\* \* \* \* \*